(12) United States Patent
Ogawa et al.

(10) Patent No.: US 10,861,332 B2
(45) Date of Patent: Dec. 8, 2020

(54) COMMUNICATION TERMINAL, SERVER DEVICE, ROUTE RETRIEVAL SYSTEM, AND COMPUTER PROGRAM

(71) Applicants: AISIN AW CO., LTD., Anjo (JP); TOYOTA JIDOSHA KABUSHIKI KAISHA, Toyota (JP)

(72) Inventors: Koji Ogawa, Okazaki (JP); Daisuke Tanizaki, Okazaki (JP); Koichi Iwatsuki, Okazaki (JP); Toyoji Hiyokawa, Okazaki (JP); Motohiro Nakamura, Okazaki (JP); Kazunori Watanabe, Okazaki (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 114 days.

(21) Appl. No.: 16/080,511

(22) PCT Filed: Mar. 23, 2017

(86) PCT No.: PCT/JP2017/011781
§ 371 (c)(1),
(2) Date: Aug. 28, 2018

(87) PCT Pub. No.: WO2017/170143
PCT Pub. Date: Oct. 5, 2017

(65) Prior Publication Data
US 2019/0066499 A1  Feb. 28, 2019

(30) Foreign Application Priority Data

Mar. 28, 2016  (JP) .................................. 2016-064275

(51) Int. Cl.
*G08G 1/0968* (2006.01)
*G01C 21/34* (2006.01)
(Continued)

(52) U.S. Cl.
CPC ....... *G08G 1/096811* (2013.01); *G01C 21/20* (2013.01); *G01C 21/34* (2013.01);
(Continued)

(58) Field of Classification Search
CPC ....... G08G 1/096811; G08G 1/096805; G08G 1/0969; G08G 1/096872; G08G 1/005;
(Continued)

(56) References Cited

U.S. PATENT DOCUMENTS 6,812,888 B2 * 11/2004 Drury ................ G01C 21/3415
342/357.31
2004/0111214 A1 * 6/2004 Buecher ........... G08G 1/096822
701/420
(Continued)

FOREIGN PATENT DOCUMENTS

JP  2003-214871 A  7/2003
JP  2009-019924 A  1/2009
(Continued)

OTHER PUBLICATIONS

Jun. 13, 2017 Search Report issued in International Patent Application No. PCT/JP2017/011781.

*Primary Examiner* — Hunter B Lonsberry
*Assistant Examiner* — Daniel M. Robert
(74) *Attorney, Agent, or Firm* — Oliff PLC

(57) ABSTRACT

A communication terminal is connected to a server device in a bidirectionally communicable manner and configured to transmit a departure point, a destination, and a route retrieval request from the departure point to the destination to the server device and to acquire a route that is retrieved and delivered by the server device in response to the route retrieval request. The communication terminal receives, from the server device, location road information for identifying a position of a moving object on a map and identi-
(Continued)

fying the position of the moving object based on the received location road information. The communication terminal transmits, to the server device, the route retrieval request in which the identified position of the moving object is set as the departure point, and receives, from the server device, a route that is retrieved by the server device in response to the route retrieval request.

8 Claims, 8 Drawing Sheets

(51) Int. Cl.
    *G08G 1/0969*     (2006.01)
    *G08G 1/005*     (2006.01)
    *G01C 21/20*     (2006.01)
    *H04L 29/08*     (2006.01)

(52) U.S. Cl.
    CPC ......... *G01C 21/3415* (2013.01); *G08G 1/005* (2013.01); *G08G 1/0969* (2013.01); *G08G 1/096805* (2013.01); *G08G 1/096872* (2013.01); *G08G 1/096883* (2013.01); *H04L 67/18* (2013.01)

(58) Field of Classification Search
    CPC .. G08G 1/096883; G01C 21/34; G01C 21/20; G01C 21/3415; H04L 67/18
    See application file for complete search history.

(56) References Cited

U.S. PATENT DOCUMENTS

| | | | |
|---|---|---|---|
| 2009/0143964 A1* | 6/2009 | Navone | G08G 1/096827 701/117 |
| 2010/0198500 A1 | 8/2010 | Sengoku et al. | |
| 2012/0036229 A1* | 2/2012 | Uyama | G08G 1/096811 709/219 |
| 2013/0238243 A1* | 9/2013 | Sengoku | G09B 29/106 701/537 |
| 2017/0191845 A1* | 7/2017 | Marueli | G01C 21/20 |

FOREIGN PATENT DOCUMENTS

| | | |
|---|---|---|
| JP | 2014-20852 A | 2/2014 |
| WO | 2012/070357 A1 | 5/2012 |

* cited by examiner

COMMUNICATION TERMINAL, SERVER DEVICE, ROUTE RETRIEVAL SYSTEM, AND COMPUTER PROGRAM

TECHNICAL FIELD

Related technical fields include communication terminals, server devices, route retrieval systems, and computer programs that are configured to retrieve a guidance route to be used for providing travel guidance for a moving object.

BACKGROUND

In recent years, there are many vehicles equipped with navigation devices configured to provide travel guidance for the vehicles so as to allow drivers to easily arrive at desired destinations. The navigation device is a device capable of detecting a current position of a vehicle by using a GPS receiver or the like, acquiring map information corresponding to the current position from a recording medium such as a DVD-ROM or an HDD or through a network, and displaying the map information on a liquid crystal monitor. The navigation device has a route retrieval function for retrieving, when a desired destination is set, an optimum route from a departure point (for example, a current position of the vehicle) to the set destination, and also has a travel guidance function for providing guidance on travel in accordance with the retrieved route (guidance route). In recent years, mobile phones, personal digital assistants (PDAs), smartphones, personal computers, or the like may have functions similar to those of the navigation device (hereinafter referred to as communication terminals including the navigation device).

In Japan, new roads (newly-built roads) are constructed nationwide every year. Along with the construction, existing roads are abolished, intersections are added, or the shapes of existing roads or intersections are changed. At this time, there is a problem in that information related to a newly-built road or the like that is newly constructed after map information provided in a communication terminal is created is not registered in the map information. That is, in a communication terminal having map information that does not include a newly-built road or the like, the newly-built road or the like is not selected in the route retrieval or guidance. Therefore, there are cases where appropriate travel guidance is not provided as in a case where a longer guidance route that does not follow the newly-built road or the like is retrieved or in a case where guidance on real roads or intersections is not provided in a map image.

In recent years, there is a proposal for a configuration in which the route retrieval is not executed on the communication terminal side but is executed by an external server device having the latest map information to acquire a guidance route from the server device (hereinafter referred to as center route retrieval). When the center route retrieval is executed, however, a route can be retrieved based on the latest map information, but the communication terminal and the server device need to communicate with each other a predetermined number of times until a guidance route is set. Therefore, a longer time is necessary until a guidance route is set than the case where the communication terminal executes the route retrieval. As a result, there is a problem in that travel guidance cannot be provided based on the guidance route for a certain length of time after a route retrieval request is given.

Japanese Patent Application Publication No. 2009-19924 (JP 2009-19924 A) proposes a technology in which, when the center route retrieval is executed, route retrieval is executed on the navigation device side in addition to the server device and a guidance route is set by using a route retrieved on the navigation device side within a range of a predetermined distance from the current position. According to this technology, even if it takes time to acquire a route retrieved by the server device from the server device, travel guidance can be provided based on the guidance route retrieved on the navigation device side during that time. Therefore, it is possible to at least prevent the occurrence of a situation in which travel guidance is not provided based on the guidance route.

SUMMARY

In the technology of JP 2009-19924 A, a route retrieved based on map information provided in the navigation device (hereinafter referred to as a local route) is used in an area within a predetermined distance from the current position, and a route retrieved based on map information provided in the server device (hereinafter referred to as a center route) is used in other areas. When the version of the map information provided in the navigation device is earlier than that of the map information provided in the server device, however, there occurs a situation in which a road where the vehicle is currently located is included in the map information of the latest version that is provided in the server device but is not included in the map information of the earlier version that is provided in the navigation device. When a request is given to the server device for a center route from a user's current position to a destination in that situation, a correct current position of the vehicle cannot be identified from the map information on the navigation device side from which the route retrieval request is given. Therefore, there is a problem in that an appropriate center route from the current position of the vehicle to the destination cannot be acquired.

Exemplary embodiments of the broad inventive principles described herein solve the problem inherent in the related art, and have an object to provide a communication terminal, a server device, a route retrieval system, and a computer program that are capable of acquiring an appropriate route from a current position of a moving object from the server device by using location road information transmitted from the server device even if the moving object travels along a new road that is not included in map information provided in the communication terminal.

Exemplary embodiments provide a communication terminal (and a computer program therefor) that is connected to a server device in a bidirectionally communicable manner and configured to transmit a departure point, a destination, and a route retrieval request from the departure point to the destination to the server device and to acquire a route that is retrieved and delivered by the server device in response to the route retrieval request. The communication terminal receives, from the server device, location road information for identifying a position of a moving object on a map and identifying the position of the moving object based on the received location road information. The communication terminal transmits, to the server device, the route retrieval request in which the identified position of the moving object is set as the departure point, and receives, from the server device, a route that is retrieved by the server device in response to the route retrieval request.

The "moving object" includes a pedestrian and a bicycle in addition to a vehicle.

Exemplary embodiments provide a server device (and a computer program therefor) connected to a communication terminal in a bidirectionally communicable manner and configured to receive a departure point, a destination, and a route retrieval request from the departure point to the destination from the communication terminal and to deliver a route retrieved in response to the received route retrieval request to the communication terminal. Specifically, the server device transmits, to the communication terminal, location road information for identifying a position of a moving object on a map, and retrieves, when the route retrieval request is received from the communication terminal, the route retrieval request in which the position of the moving object that is identified by the communication terminal based on the location road information is set as the departure point. The server retrieves a route from the departure point to the destination by using device-side route retrieval road information provided in the server device, and delivers the retrieved route to the communication terminal.

The "retrieval of the route from the departure point to the destination" includes formation of a route from the departure point to the destination through connection of a plurality of routes in addition to selection of an optimum route from among a plurality of route candidates using cost values.

Exemplary embodiments provide a route retrieval system including the server device and the communication terminal.

According to the communication terminal, the server device, the route retrieval system, and the computer program having the configurations described above, when center route retrieval is executed, it is possible to minimize the occurrence of an event that travel guidance is not provided based on a guidance route after the route retrieval request is given from the communication terminal. Even if the moving object travels along a new road that is not included in the map information provided in the communication terminal, an appropriate route from the current position of the moving object can be acquired from the server device by using the location road information transmitted from the server device.

DETAILED DESCRIPTION OF EXEMPLARY EMBODIMENTS

Figure 1:
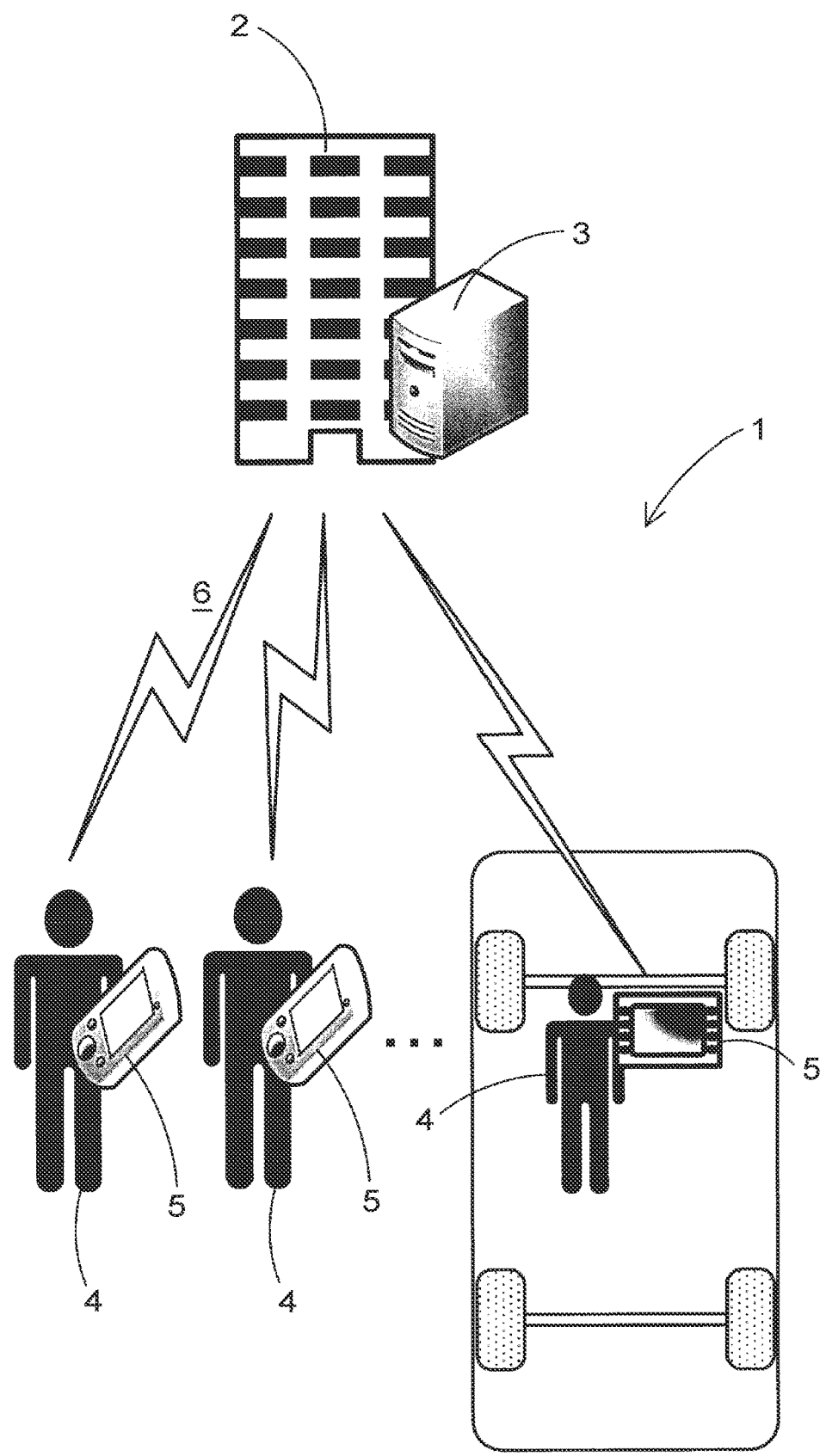
FIG. 1 is a schematic configuration diagram illustrating a route retrieval system according to an embodiment.
Figure 2:
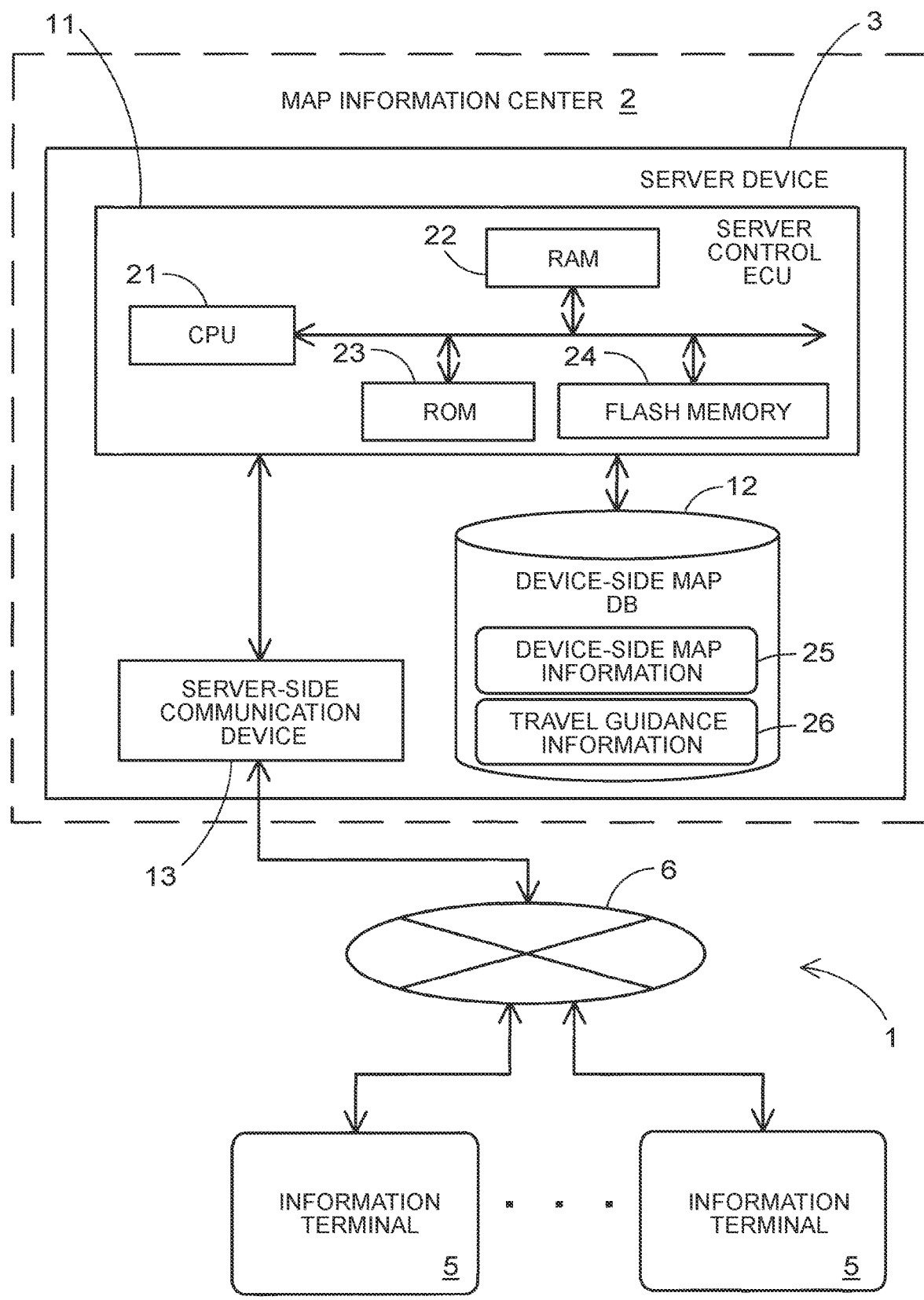
FIG. 2 is a block diagram illustrating the configuration of the route retrieval system according to the embodiment.

An embodiment that implements a communication terminal, a server device, a route retrieval system, and a computer program is described below in detail with reference to the drawings. First, the schematic configuration of a route retrieval system 1 according to this embodiment is described with reference to FIG. 1 and FIG. 2. FIG. 1 is a schematic configuration diagram illustrating the route retrieval system 1 according to this embodiment. FIG. 2 is a block diagram illustrating the configuration of the route retrieval system 1 according to this embodiment.

As illustrated in FIG. 1, the route retrieval system 1 according to this embodiment basically includes a server device 3 provided in a map information center 2, and communication terminals 5 possessed by users 4. The server device 3 and the communication terminal 5 are configured to transmit and receive electronic data therebetween via a communication network 6. Examples of the communication terminal 5 include a mobile phone, a smartphone, a tablet terminal, a personal computer, and a navigation device. The user 4 may ride in a vehicle but need not ride in a vehicle.

The server device 3 executes route retrieval in response to a request from the communication terminal 5. Specifically, when a destination is set in the communication terminal 5 or when route retrieval is executed again (rerouting), information necessary for route retrieval, such as a departure point and the destination, is transmitted from the communication terminal 5 to the server device 3 together with the route retrieval request (when route retrieval is executed again, the information related to the destination is not transmitted necessarily). The server device 3 that receives the route retrieval request executes the route retrieval by using map information provided in the server device 3 to identify a recommended route from the departure point to the destination. Then, the identified recommended route is transmitted to the communication terminal 5 that has given the request. The communication terminal 5 sets the received recommended route as a guidance route, and provides travel guidance in accordance with the guidance route. Thus, even if the map information provided in the communication terminal 5 is map information of an earlier version at the time of route retrieval, an appropriate guidance route can be set based on map information of the latest version that is provided in the server device 3. Particularly in this embodiment, when a predetermined condition is satisfied, not only the server device 3 but also the communication terminal 5 executes route retrieval by using the map information provided in the communication terminal 5, and a recommended route retrieved by the communication terminal 5 (hereinafter referred to as a terminal-recommended route) is transmitted to the server device 3 together with the route retrieval request. The server device 3 executes route retrieval by using the terminal-recommended route as described later.

The communication terminal 5 is possessed by the user 4, and an information terminal having a navigation function is used as the communication terminal 5. For example, the communication terminal 5 corresponds to a mobile phone, a smartphone, a tablet terminal, a personal computer, and a navigation device.

The navigation function corresponds to functions of retrieving a route corresponding to conditions specified by the user, displaying a map image around a current position of the user 4, displaying the current position of the user 4 in the displayed map image, and providing travel guidance along the set guidance route. The communication terminal 5 need not have all the features of the navigation function as the communication terminal 5 at least has the function of retrieving a route and the function of providing travel guidance along the set guidance route.

The communication network 6 includes a large number of base stations arranged nationwide, and a communication service provider that manages and controls the base stations, and is implemented by connecting the base stations and the communication service provider to each other by wire (such as an optical fiber or ISDN) or by wireless. The base station includes a transceiver (transmitter/receiver) and an antenna for communication with the communication terminal 5. The base station executes wireless communication with the communication service provider, and serves as a terminal of the communication network 6 to relay communication between the server device 3 and the communication terminal 5 located within a range (cell) in which radio waves of the base station are reachable.

Next, the configuration of the server device 3 in the route retrieval system 1 is described in more detail with reference to FIG. 2. As illustrated in FIG. 2, the server device 3 includes a server control ECU 11, a device-side map DB 12 serving as storage medium connected to the server control ECU 11, and a server-side communication device 13. (As used herein the term "storage medium" is not intended to encompass transitory signals.)

The server control ECU 11 (electronic control unit) is an electronic control unit configured to control the entire server device 3, and includes a CPU 21 serving as a computation device and a control device, and internal storage media such as a RAM 22 to be used as a working memory when the CPU 21 executes various types of arithmetic processing, a ROM 23 configured to store a control program, a route retrieval processing program (see FIG. 4) described later, and the like, and a flash memory 24 configured to store the programs read from the ROM 23. The server control ECU 11 includes various means serving as processing algorithms in cooperation with an ECU of the communication terminal 5 described later. For example, location road information transmitting means transmits, to the communication terminal 5, travel guidance information 26 for identifying the position of a moving object (for example, the user or vehicle) on a map. Retrieval request receiving means receives, when a route retrieval request is received from the communication terminal 5, a route retrieval request in which the position of the moving object that is identified by the communication terminal 5 based on the travel guidance information 26 is set as a departure point. Route retrieving means retrieves a route from the departure point to a destination by using the map information provided in the server device 3. Route delivering means delivers the route retrieved by the route retrieving means to the communication terminal 5.

The device-side map DB 12 is storage means in which device-side map information (device-side route retrieval road information) 25 that is map information of the latest version and is registered based on data input from the outside or on an input operation is stored while being sectioned in areas (for example, level-10 meshes of 20 km square). The version is creation timing information for identifying a timing when the map information is created. By referring to the version, the timing when the map information is created can be identified.

The device-side map information 25 basically has the same configuration as that of the map information stored in the communication terminal 5, and is constituted by various types of information necessary for route retrieval, route guidance, and map display as typified by a road network. For example, the device-side map information 25 is constituted by link data related to roads (links), node data related to node points, intersection data related to intersections, location data related to locations such as facilities, map display data to be used for displaying a map, retrieval data to be used for retrieving a route, and search data to be used for searching for a location.

As described later, various types of data to be used for route retrieval processing for retrieving a route from a departure point (for example, a current position of the vehicle) to a set destination are stored as the retrieval data. Examples of the data stored as the retrieval data include cost calculation data to be used for calculating retrieval costs such as a cost indicating a numerical level of appropriateness of a route relative to an intersection (hereinafter referred to as an intersection cost), and a cost indicating a numerical level of appropriateness of a route relative to a link that constitutes a road (hereinafter referred to as a link cost).

In the device-side map DB 12, the travel guidance information (location road information) 26 that is information to be used for identifying a current position and providing simple travel guidance along a guidance route in the communication terminal 5 in association with map information of the latest version is stored separately from the device-side map information 25 while being sectioned in areas (for example, level-13 meshes of 2.5 km square).

The travel guidance information 26 includes matching data necessary for map matching of a current position of the user, guidance data necessary for guidance that prompts the user to move along a guidance route, such as guidance on a right or left turn at a guidance intersection, and display data to be used for displaying a map image and a guidance screen. Examples of the matching data include data to be used for identifying a road shape. Examples of the guidance data include data to be used for identifying the shape of an intersection and a connection relationship between an intersection and a road. The display data includes data to be used for displaying a map image including a road network and a guidance screen for providing travel guidance on a display of the communication terminal 5.

When a route retrieval request is received from the communication terminal 5 as described later, the server control ECU 11 retrieves a route from a departure point to a destination by using the device-side map information 25. The server control ECU 11 delivers the retrieved route to the communication terminal 5 that has given the request. The server control ECU 11 also delivers the travel guidance information 26 to the communication terminal 5 as necessary. Specifically, the server control ECU 11 is configured to deliver, to the communication terminal 5, the travel guidance information 26 for a target area that is an area where the communication terminal 5 may move in the future (for example, an area around a current position of the communication terminal 5 or around a guidance route set by the communication terminal 5) and is an area in which the version of the map information provided in the communication terminal 5 is earlier than that of the device-side map information 25.

The server-side communication device 13 is a communication device for communication with the communication terminal 5 via the communication network 6. In addition to the communication with the communication terminal 5, the server-side communication device 13 is capable of receiving traffic information constituted by traffic jam information, traffic control information, traffic accident information, and other information transmitted via the Internet or from a traffic information center such as the Vehicle Information and Communication System (VICS; registered trademark) center or a probe center.

Figure 3:
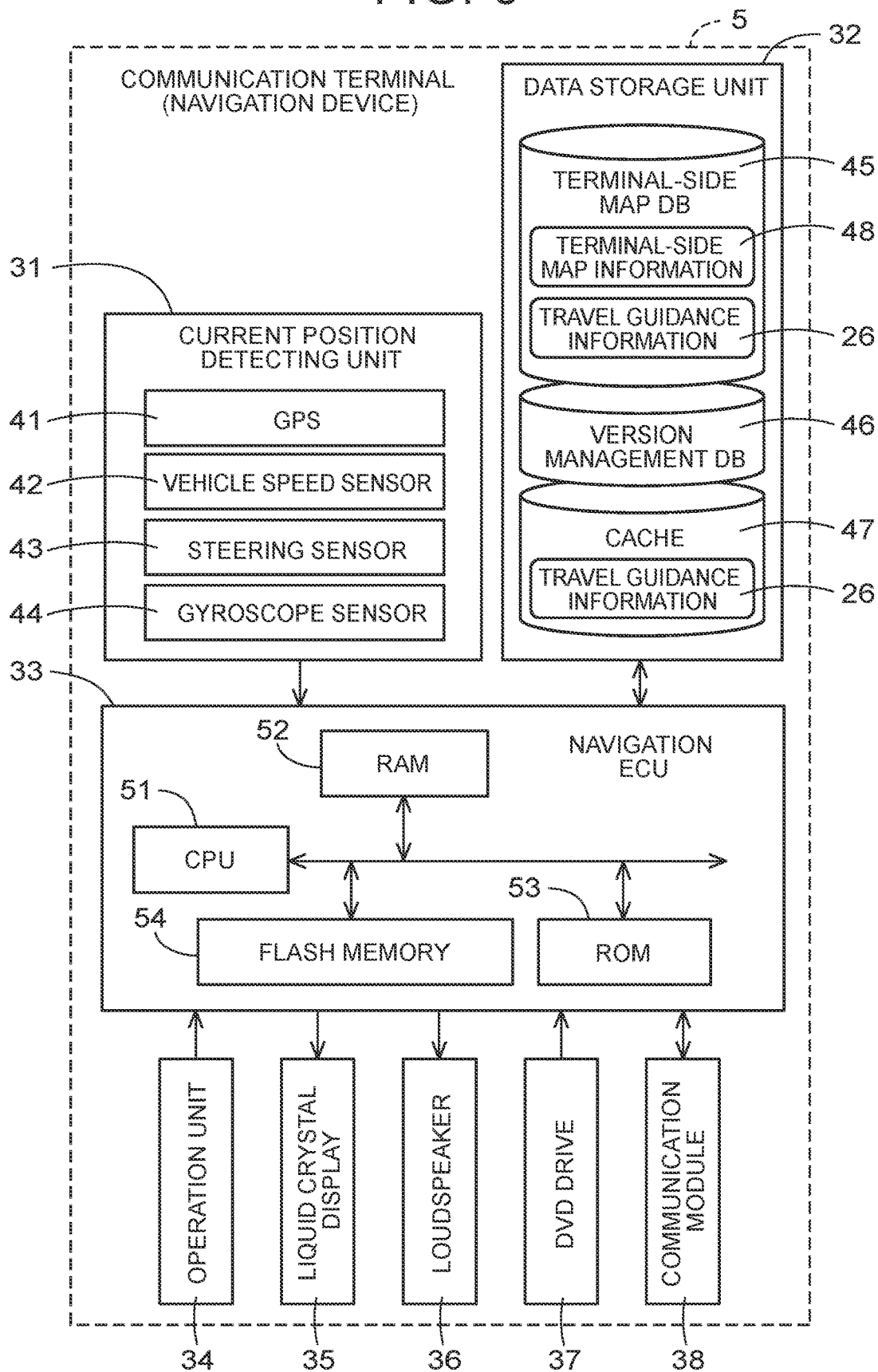
FIG. 3 is a block diagram schematically illustrating a control system of a communication terminal according to the embodiment.

Next, the schematic configuration of the communication terminal 5 is described with reference to FIG. 3. The following description is given taking an exemplary case where a navigation device mounted on a vehicle is used as the communication terminal 5 and travel guidance is provided particularly for a vehicle as a moving object. A mobile phone, a tablet terminal, a personal computer, or the like may be used instead of the navigation device. When the mobile phone or the tablet terminal is used, travel guidance may be provided for a moving object other than the vehicle (for example, a pedestrian or a bicycle). FIG. 3 is a block diagram schematically illustrating a control system of the navigation device that is the communication terminal 5 according to this embodiment.

As illustrated in FIG. 3, the communication terminal 5 according to this embodiment includes a current position detecting unit 31 configured to detect a current position of the vehicle (moving object) equipped with the navigation device that is the communication terminal 5, a data storage unit 32 configured to store various types of data, a navigation ECU 33 configured to execute various types of arithmetic processing based on input information, an operation unit 34 configured to receive an operation from the user, a liquid crystal display 35 configured to display a map and a guidance route to a destination for the user, a loudspeaker 36 configured to output audio guidance related to route guidance, a DVD drive 37 configured to read a DVD that is a storage medium, and a communication module 38 configured to communicate with the server device 3, the VICS center, or the like.

Components that constitute the communication terminal 5 are described below in sequence.

The current position detecting unit 31 includes a GPS 41, a vehicle speed sensor 42, a steering sensor 43, a gyroscope sensor 44, and the like, and is capable of detecting a current position of the vehicle, an azimuth, a traveling speed of the vehicle, a current time, and the like. In particular, the vehicle speed sensor 42 is a sensor for detecting a travel distance and a vehicle speed of the vehicle. The vehicle speed sensor 42 generates a pulse in response to rotation of driving wheels of the vehicle, and outputs a pulse signal to the navigation ECU 33. The navigation ECU 33 counts the generated pulses to calculate a rotation speed of the driving wheels and a travel distance. The communication terminal 5 need not include all of the four types of sensor. The communication terminal 5 may include one or a plurality of types of sensor out of those sensors.

The data storage unit 32 includes a hard disk (not illustrated) serving as an external storage device and a recording medium, and a recording head (not illustrated) that is a driver for reading a terminal-side map DB 45, a version management DB 46, a cache 47, predetermined programs, and the like that are stored in the hard disk and for writing predetermined data into the hard disk. The data storage unit 32 may be implemented by a memory card or an optical disc such as a CD or a DVD instead of the hard disk.

The terminal-side map DB 45 is storage means for storing terminal-side map information (terminal-side route retrieval road information) 48 to be used for route retrieval and travel guidance in the communication terminal 5.

Similarly to the device-side map information 25 described above, the terminal-side map information 48 stored in the terminal-side map DB 45 is constituted by various types of information necessary for route retrieval, route guidance, and map display as typified by a road network. For example, the terminal-side map information 48 is constituted by link data related to roads (links), node data related to node points, intersection data related to intersections, location data related to locations such as facilities, map display data to be used for displaying a map, retrieval data to be used for retrieving a route, and search data to be used for searching for a location.

The terminal-side map information 48 stored in the terminal-side map DB 45 is updated to map information of a new version in units of segment (for example, in units of mesh) by rewriting new data over data at a target location based on map update information delivered from an unillustrated map delivering server or map update information acquired from a recording medium. In the terminal-side map DB 45, the travel guidance information 26 to be used for identifying a current position, providing travel guidance along a guidance route, and displaying an image in the communication terminal 5 in association with the map information is also stored while being sectioned in areas (for example, level-13 meshes of 2.5 km square).

The version management DB 46 is storage means in which information for identifying the version of the terminal-side map information 48 currently stored in the terminal-side map DB 45 (for example, a version number and a date of last update) is stored in units of segment (for example, in units of mesh) of the map information. The contents of the version management DB 46 are updated along with updating of the terminal-side map information 48 to map information of a new version.

The cache 47 is storage means for temporarily storing the travel guidance information 26 delivered from the server device 3. In the route retrieval system 1 according to this embodiment, as described above, the travel guidance information 26 for a target area where the vehicle may travel in the future (for example, an area around a current position of the vehicle or around a guidance route set by the communication terminal 5) and in which the version of the terminal-side map information 48 provided in the communication terminal 5 is earlier than that of the device-side map information 25 is delivered from the server device 3 and stored in the cache 47. As described above, the travel guidance information 26 is information to be used for identifying a current position, providing simple travel guidance along a guidance route, and displaying an image in the communication terminal 5 in association with the latest map information.

In the area in which the version of the terminal-side map information 48 provided in the communication terminal 5 is earlier than that of the device-side map information 25, the navigation ECU 33 identifies a current position of the vehicle, provides travel guidance along a guidance route, and displays an image by using the travel guidance information 26 of a new version that is stored in the cache 47 instead of the map information and the travel guidance information of the earlier versions that are stored in the terminal-side map DB 45. When the storage area of the cache 47 is not sufficient, pieces of the travel guidance information 26 that are stored in the cache 47 and have lower priority levels are deleted in sequence.

The navigation ECU (electronic control unit) 33 is an electronic control unit configured to control the entire communication terminal 5, and includes a CPU 51 serving as a computation device and a control device, and internal storage devices such as a RAM 52 to be used as a working memory when the CPU 51 executes various types of arithmetic processing and configured to store, for example, route data to be used when a route is retrieved, a ROM 53 configured to store a control program, the route retrieval processing program (see FIG. 4) described later, and the like, and a flash memory 54 configured to store the programs read from the ROM 53. The navigation ECU 33 includes various means serving as processing algorithms in cooperation with the ECU of the server device 3. For example, position identifying means receives, from the server device 3, the travel guidance information 26 for identifying the position of the moving object (vehicle) on a map, and identifies the position of the moving object based on the received travel guidance information 26. Retrieval request transmitting means transmits, to the server device 3, a route retrieval request in which the position of the moving object that is identified by the position identifying means is set as a departure point. Route receiving means receives, from the server device 3, a route that is retrieved by the server device in response to the route retrieval request.

The operation unit 34 is operated, for example, when inputting a departure point serving as a travel start point and a destination serving as a travel end point, and includes a plurality of operation switches (not illustrated) such as various keys and buttons. The navigation ECU 33 executes control so as to execute various corresponding operations based on switch signals output by, for example, pressing the switches. The operation unit 34 may include a touch panel provided on the front surface of the liquid crystal display 35. The operation unit 34 may include a microphone and a voice recognition device.

The liquid crystal display 35 displays a map image including roads, traffic information, operation guidance, an operation menu, key guidance, a guidance route from a departure point to a destination, guidance information along the guidance route, news, weather forecast, time, email, TV programs, and the like. An HUD or an HMD may be used instead of the liquid crystal display 35.

The loudspeaker 36 outputs audio guidance for providing travel guidance along a guidance route and guidance on traffic information based on instructions from the navigation ECU 33.

The DVD drive 37 is a drive capable of reading data stored in a recording medium such as a DVD or a CD. For example, music and video are reproduced and the terminal-side map DB 45 is updated based on the read data. A card slot for reading and writing a memory card may be provided instead of the DVD drive 37.

The communication module 38 is a communication device for receiving information such as map update information, route information, travel guidance information, or traffic information transmitted from, for example, the server device 3, the VICS (registered trademark) center, or the probe center. For example, the communication module 38 corresponds to a mobile phone or a DCM.

Figure 4:
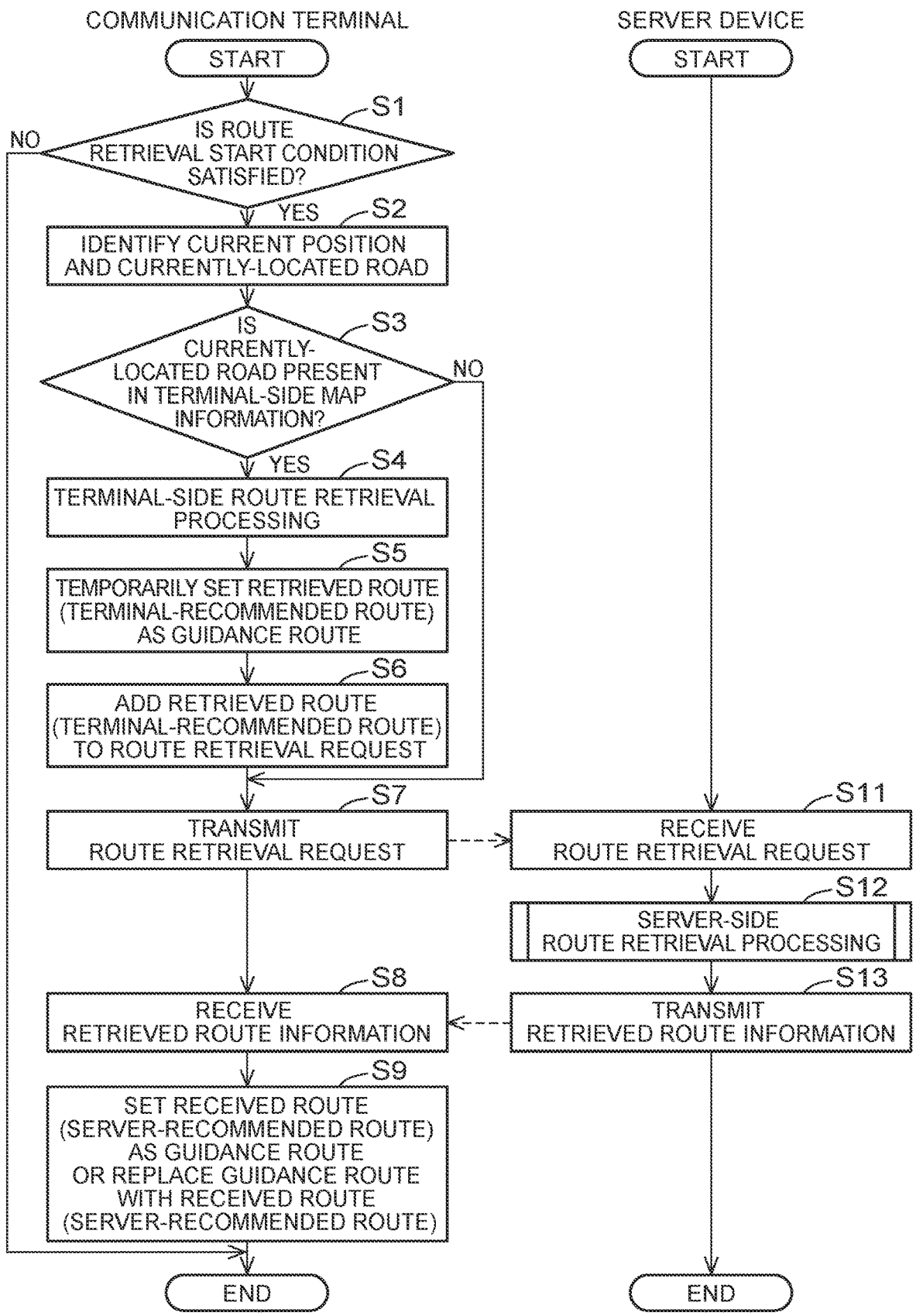
FIG. 4 is a flowchart of a route retrieval processing program according to the embodiment.
Figure 6:
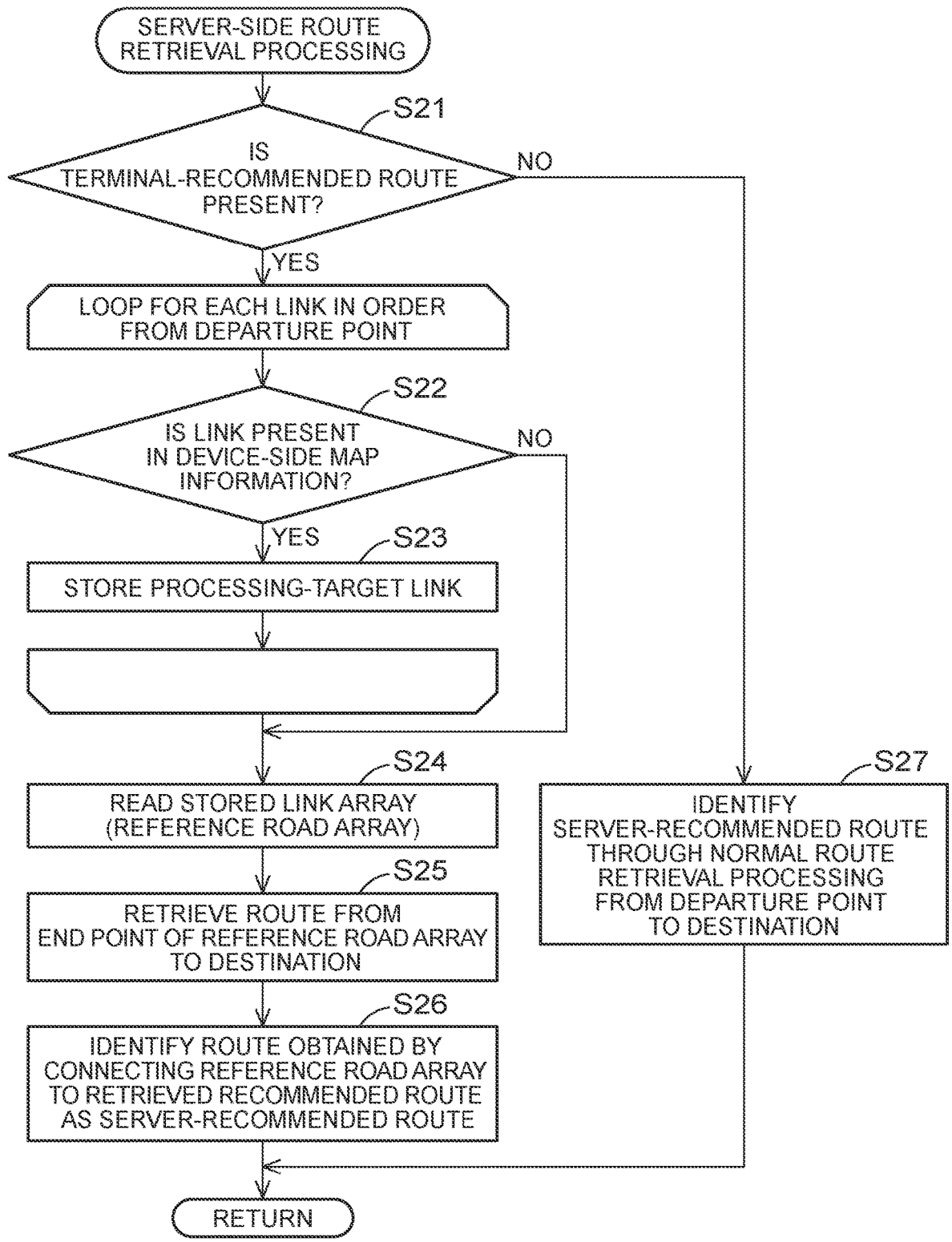
FIG. 6 is a flowchart of a subordinate processing program of server-side route retrieval processing.

Next, the route retrieval processing program to be executed by the server device 3 and the communication terminal 5 in the route retrieval system 1 having the configuration described above is described with reference to FIG. 4. FIG. 4 is a flowchart of the route retrieval processing program according to this embodiment. The route retrieval processing program is a program that is executed when a route retrieval start condition is satisfied in the communication terminal 5 (for example, when an operation of setting a destination is received or when the vehicle deviates from a guidance route set by the communication terminal 5) and is configured to retrieve a route from a departure point to a destination by using center route retrieval. The following programs illustrated in the flowcharts of FIG. 4 and FIG. 6 are stored in the RAM or the ROM provided in the server device 3 or the communication terminal 5, and are executed by the CPU 21 or the CPU 51.

First, the route retrieval processing program to be executed by the CPU 51 of the communication terminal 5 is described with reference to FIG. 4. In Step (hereinafter abbreviated as "S") 1, the CPU 51 determines whether the route retrieval start condition is satisfied. The case where the route retrieval start condition is satisfied corresponds to, for example, a case where an operation of setting a new destination is received in the communication terminal 5 or a case where the vehicle deviates from a guidance route set by the communication terminal 5 (rerouting).

When it is determined that the route retrieval start condition is satisfied (S1: YES), the processing proceeds to S2. When it is determined that the route retrieval start condition is not satisfied (S1: NO), the route retrieval processing program is terminated.

In S2, the CPU 51 identifies a current position of the vehicle and a road where the vehicle is currently located (hereinafter referred to as a currently-located road) based on a detection result from the current position detecting unit 31 or the map information. When the vehicle deviates from a guidance route set by the communication terminal 5, a current position of the vehicle and a currently-located road after the deviation are identified in particular. When the current position of the vehicle and the currently-located road are identified, map matching processing for matching the current position of the vehicle with the map information is executed. The current position of the vehicle and the currently-located road are basically identified based on the terminal-side map information 48 and the travel guidance information 26 that are stored in the terminal-side map DB 45. When the version of the terminal-side map information 48 in an area where the vehicle is currently located is earlier than that of the device-side map information 25, the current position of the vehicle and the currently-located road are identified by using the travel guidance information 26 stored in the cache 47 instead of the map information and the travel guidance information of the earlier versions that are stored in the terminal-side map DB 45. Thus, a road that is not included in the terminal-side map information 48 may be identified as the currently-located road. The travel guidance information 26 stored in the cache 47 is travel guidance information 26 corresponding to map information of a new version that is provided in the server device 3, and is transmitted from the server device 3 for an area around the current position of the vehicle or around the guidance route set by the communication terminal 5, for example, when the communication terminal 5 is activated, when the guidance route is set by the communication terminal 5, or when the vehicle travels across a mesh.

Next, in S3, the CPU 51 determines whether the currently-located road identified in S2 is a road included in the terminal-side map information 48 provided in the communication terminal 5.

When it is determined that the currently-located road is included in the terminal-side map information 48 provided in the communication terminal 5 (S3: YES), the processing proceeds to S4. When it is determined that the currently-located road is not included in the terminal-side map information 48 provided in the communication terminal 5 (S3: NO), that is, the currently-located road is a newly-built road included only in the map information of the latest version, the processing proceeds to S7.

In S4, the CPU 51 executes route retrieval processing from a departure point to a destination by using the terminal-side map information 48 provided in the communication terminal 5 to identify a recommended route from the departure point to the destination (hereinafter referred to as a terminal-recommended route). Specifically, based on the link data, the node data, the retrieval data, and the like included in the terminal-side map information 48, the CPU 51 calculates, for example, a link cost indicating a numerical level of appropriateness of a route relative to a link (road), an intersection cost indicating a numerical level of appropriateness of a route relative to an intersection (node), and a fee cost indicating a numerical level of payment necessary for travel, and retrieves a terminal-recommended route by using the calculated retrieval costs. For example, a route in which the total of the cost values is minimized is set as the terminal-recommended route by using the publicly-known Dijkstra's algorithm. The route retrieval processing using the Dijkstra's algorithm is publicly known, and therefore details are omitted. The departure point is basically the current position of the vehicle, and is a location identified in S2 (on the currently-located road).

Next, in S5, the CPU 51 temporarily sets the terminal-recommended route retrieved through the route retrieval processing in S4 as a guidance route that is used for travel guidance for the vehicle in the communication terminal 5. Then, the travel guidance for the vehicle is started based on the guidance route temporarily set in S5. For example, a map image including a road network around the position of the vehicle equipped with the communication terminal 5 is displayed. When the vehicle reaches a predetermined distance from a guidance branch point where a right or left turn may be made, an enlarged view of the guidance branch point is displayed, or guidance is provided on a traveling direction of the vehicle at the guidance branch point. The CPU 51 basically provides the travel guidance based on the terminal-side map information 48 and the travel guidance information 26 that are stored in the terminal-side map DB 45. When the versions of the terminal-side map information 48 and the travel guidance information 26 that are stored in the terminal-side map DB 45 are not the latest versions in an area around the current position of the vehicle, the travel guidance information 26 is acquired from the server device 3, and the travel guidance is provided by using the acquired travel guidance information 26 as well. The travel guidance information 26 includes the matching data necessary for map matching of the vehicle, the guidance data necessary for guidance that prompts the vehicle to travel along a guidance route, such as guidance on a right or left turn at a guidance intersection, and the display data to be used for displaying a map image and a guidance screen. Therefore, even if the terminal-side map information 48 and the travel guidance information 26 that are stored in the terminal-side map DB 45 are not compatible with the guidance route, guidance can be provided at least in a state in which the current position of the vehicle is identified as a correct position, and guidance can be provided on a correct traveling direction of the vehicle at a guidance intersection.

Next, in S6, the CPU 51 adds route information for identifying the terminal-recommended route retrieved in S4 to a route retrieval request for requesting retrieval of a route from the departure point to the destination. Information for identifying the entire terminal-recommended route may be added as the route information for identifying the terminal-recommended route. In this embodiment, however, information for identifying a continuous road array from the departure point within a predetermined distance L from the departure point is added. In this embodiment, the road array is a link array, and a link partially included in the predetermined distance L is included as an addition target. The link partially included in the predetermined distance L may be excluded from the addition target.

Figure 5:
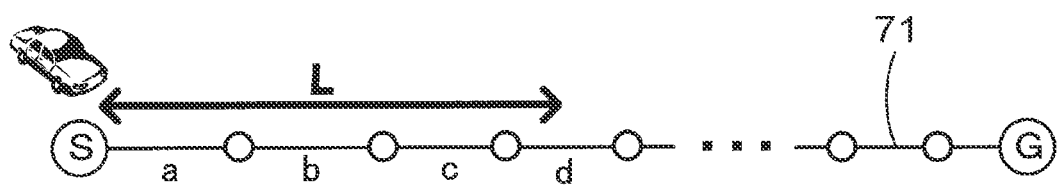
FIG. 5 is a diagram illustrating a terminal-recommended route retrieved by the communication terminal.

For example, when a terminal-recommended route 71 illustrated in FIG. 5 is retrieved in S4, information for identifying continuous links a to d (for example, link IDs) from the departure point within the predetermined distance L from the departure point out of the links that constitute the terminal-recommended route 71 is added to the route retrieval request as the route information. The predetermined distance L may be a fixed value (for example, 1 km), or may be set based on a vehicle speed, a communication environment, a processing speed of the server device 3, or the like. It is desirable that the predetermined distance L be set longer than a distance by which the vehicle presumably travels until the communication terminal 5 acquires a route retrieved by the server device 3 and sets the route as a guidance route (until the processing of S9 is executed). For example, the predetermined distance L is set to "current vehicle speed of vehicle×15 seconds".

Next, in S7, the CPU 51 transmits, to the server device 3, the route retrieval request for requesting retrieval of a route from the departure point to the destination. The route retrieval request includes a terminal ID for identifying the communication terminal 5 that has transmitted the route retrieval request, and information for identifying the departure point (current position of the vehicle that is identified in S2) and the destination that are route retrieval conditions. When rerouting is executed along with deviation of the vehicle from the guidance route, the destination is basically the same as that of the previous retrieval. Therefore, the information for identifying the destination need not be transmitted. When it is determined that the currently-located road is included in the terminal-side map information 48 provided in the communication terminal 5, the route information for identifying the terminal-recommended route retrieved in S2 is transmitted together with the route retrieval request.

Then, in S8, the CPU 51 receives retrieved route information that is transmitted from the server device 3 in response to the route retrieval request. The retrieved route information received in S8 is information related to a recommended route from the departure point to the destination that is retrieved by the server device 3 by using the device-side map information 25 that is map information of the latest version (hereinafter referred to as a server-recommended route) based on the route retrieval request transmitted in S7. Details of the server-recommended route are described later.

Next, in S9, the CPU 51 sets the server-recommended route retrieved by the server device 3 as a guidance route based on the retrieved route information received in S8. When the guidance route is temporarily set in S3, the CPU 51 replaces the guidance route with the server-recommended route retrieved by the server device 3. When the terminal-recommended route and the server-recommended route are the same route, the replacement is not necessary. Then, travel guidance for the vehicle is provided based on the guidance route set in S9.

When the guidance route is not temporarily set in S5, travel guidance cannot be provided based on the guidance route until the server-recommended route is received from the server device 3. During that period as well, travel guidance (for example, map display around the position of the vehicle equipped with the communication terminal 5) can continuously be provided based on the travel guidance information 26. In particular, the travel guidance information 26 acquired from the server device 3 is created based on map information of the latest version. Therefore, guidance can appropriately be provided even if the vehicle is located on a newly-built road that is not present in the terminal-side map information 48 provided in the communication terminal 5.

Next, the route retrieval processing program to be executed by the CPU 21 of the server device 3 is described.

First, in S11, the CPU 21 receives the route retrieval request transmitted from the communication terminal 5 in which the route retrieval start condition is satisfied. The route retrieval request includes the terminal ID for identifying the communication terminal 5 that has transmitted the route retrieval request, the information for identifying the departure point (current position of the vehicle that is identified in S2) and the destination that are the route retrieval conditions, and the route information for identifying the terminal-recommended route retrieved in S4 as necessary.

Next, in S12, the CPU 21 executes server-side route retrieval processing described later (FIG. 6). In the server-side route retrieval processing, as described later, the CPU 21 executes route retrieval processing from the departure point to the destination by using the route retrieval request received in S11 and the device-side map information 25 provided in the server device 3 to identify a recommended route from the departure point to the destination (server-recommended route). When the route information for identifying the terminal-recommended route retrieved by the communication terminal 5 is received together with the route retrieval request, the server-recommended route is a route including at least a part of the terminal-recommended route.

Next, in S13, the CPU 21 transmits retrieved route information for identifying the server-recommended route identified in S12 to the communication terminal 5 that has transmitted the route retrieval request. As a result, the server-recommended route is set as the guidance route in the communication terminal 5 (S9).

Next, subordinate processing of the server-side route retrieval processing executed in S12 is described with reference to FIG. 6. FIG. 6 is a flowchart of a subordinate processing program of the server-side route retrieval processing.

First, in S21, the CPU 21 determines whether the route information for identifying the terminal-recommended route is received together with the route retrieval request in S11. The route information for identifying the terminal-recommended route is transmitted from the communication terminal 5 when it is determined that the currently-located road is included in the terminal-side map information 48 provided in the communication terminal 5.

When it is determined that the route information for identifying the terminal-recommended route is received together with the route retrieval request (S21: YES), the processing proceeds to S22. When it is determined that the route retrieval request is received without receiving the route information for identifying the terminal-recommended route (S21: NO), the processing proceeds to S27.

The following processing of S22 and S23 is executed in ascending order of the distance from the departure point for the links that constitute the link array identified by the route information received together with the route retrieval request in S11. As described above, the route information is information for identifying a continuous link array from the departure point (for example, the links a to d in the example illustrated in FIG. 5) within the predetermined distance L from the departure point in the terminal-recommended route.

First, in S22, the CPU 21 determines whether a processing-target link is a link included in the device-side map information 25 provided in the server device 3, that is, whether a processing-target link is a link present in the map information of the latest version.

When it is determined that the processing-target link is the link included in the device-side map information 25 provided in the server device 3 (S22: YES), that is, the processing-target link is the link present in the map information of the latest version, the processing proceeds to S23. In S23, the CPU 21 stores information for identifying the processing-target link (for example, a link ID) in the flash memory 24 or the like. Then, the CPU 21 executes the processing of S22 and the subsequent processing again after the processing-target link is changed to a link adjacent on the destination side.

When it is determined that the processing-target link is not the link included in the device-side map information 25 provided in the server device 3 (S22: NO), that is, the processing-target link is a link that is not present in the map information of the latest version (such as an abolished road), the processing proceeds to S24.

In S24, the CPU 21 reads, from the flash memory 24 or the like, the link array that is stored in S23 through the determination that the link array is included in the device-side map information 25 up to the current time (by the time when the determination is NO in S22). The read link array is a link array portion that is included in the device-side map information 25 provided in the server device 3 and includes the departure point in the link array identified by the route information received together with the route retrieval request in S11. The link array read in S24 is hereinafter referred to as a reference road array.

Figure 7:
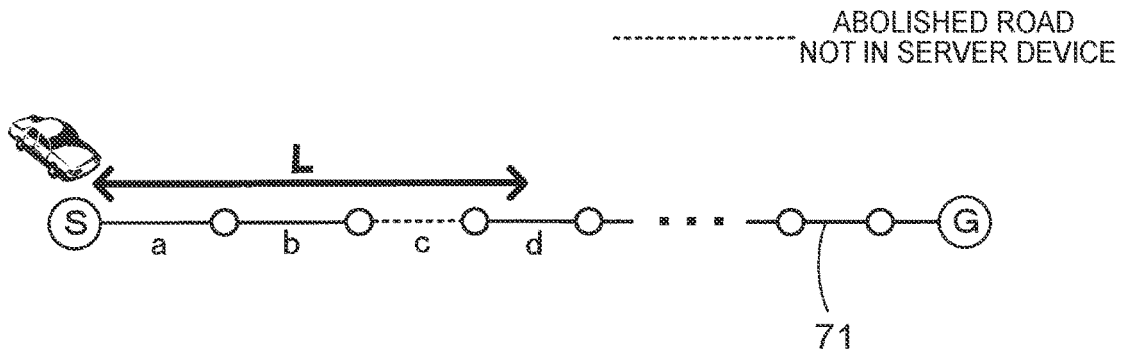
FIG. 7 is a diagram illustrating a reference road array.

For example, when the terminal-recommended route 71 illustrated in FIG. 7 is retrieved in S4 and when the link a, the link b, and the link d are included in the device-side map information 25 but the link c is not included in the device-side map information 25 among the links a to d that are present within the predetermined distance L from the departure point, the link a and the link b that are present on the departure point side with respect to the link c are the reference road array. When the link a that is a link connected to the departure point is not included in the device-side map information 25, it is determined that the reference road array is not present.

Then, in S25, the CPU 21 executes route retrieval processing from an end point of the reference road array to the destination by using the device-side map information 25 provided in the server device 3 to identify a recommended route from the end point of the reference road array to the destination (hereinafter referred to as a continued recommended route). Specifically, based on the link data, the node data, the retrieval data, and the like of the latest version that are included in the device-side map information 25, the CPU 21 calculates, for example, a link cost indicating a numerical level of appropriateness of a route relative to a link (road), an intersection cost indicating a numerical level of appropriateness of a route relative to an intersection (node), and a fee cost indicating a numerical level of payment necessary for travel, and retrieves a continued recommended route by using the calculated retrieval costs. For example, a route in which the total of the cost values is minimized is set as the continued recommended route by using the publicly-known Dijkstra's algorithm. The route retrieval processing using the Dijkstra's algorithm is publicly known, and therefore details are omitted.

Next, in S26, the CPU 21 connects the reference road array to the continued recommended route retrieved in S25, and identifies the connected route from the departure point to the destination as a complete server-recommended route. Then, the processing proceeds to S13, and the CPU 21 transmits retrieved route information for identifying the identified server-recommended route to the communication terminal 5 that has transmitted the route retrieval request.

Figure 8:
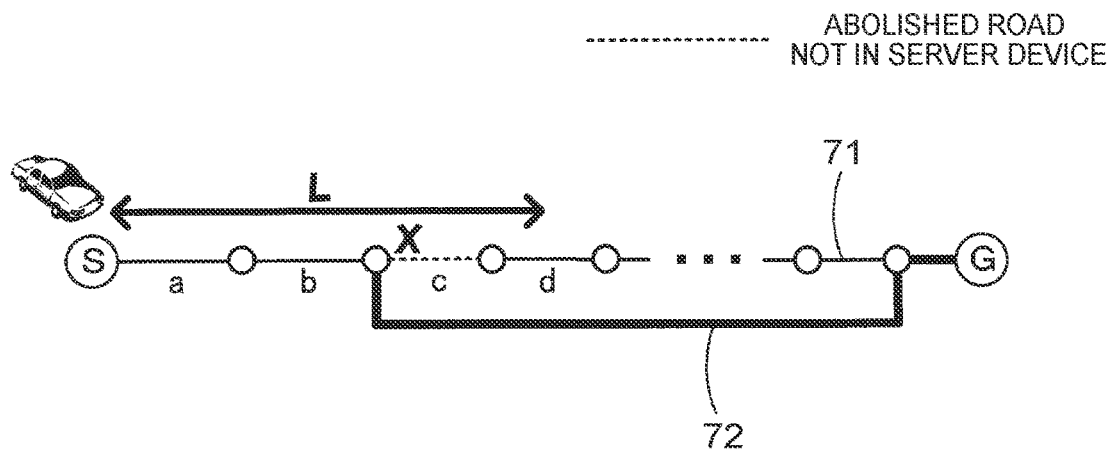
FIG. 8 is a diagram illustrating a server-recommended route retrieved by a server device.

For example, when the terminal-recommended route 71 illustrated in FIG. 8 is retrieved in S4 and when the link a and the link b are the reference road array, a continued recommended route 72 that is a recommended route from an end point X of the link b to the destination is retrieved in S24. A route obtained by connecting the link array of the link a and the link b to the continued recommended route 72 is the server-recommended route. When the reference road array is not present (for example, when the link a that is a link connected to the departure point is not included in the device-side map information 25), a route retrieved through normal route retrieval from the departure point to the destination is set as the server-recommended route.

In S26, the CPU 21 does not necessarily transmit the information for identifying the entire server-recommended route, but may transmit only information for identifying a portion other than the reference road array (that is, the continued recommended route). In this case, the route to the destination can be identified by connecting the continued recommended route transmitted from the server device 3 to the terminal-recommended route retrieved in S4 by the communication terminal 5.

In S27, the CPU 21 executes normal route retrieval processing from the departure point to the destination by using the device-side map information 25 provided in the server device 3 to set a recommended route from the departure point to the destination as the server-recommended route.

Figure 9:
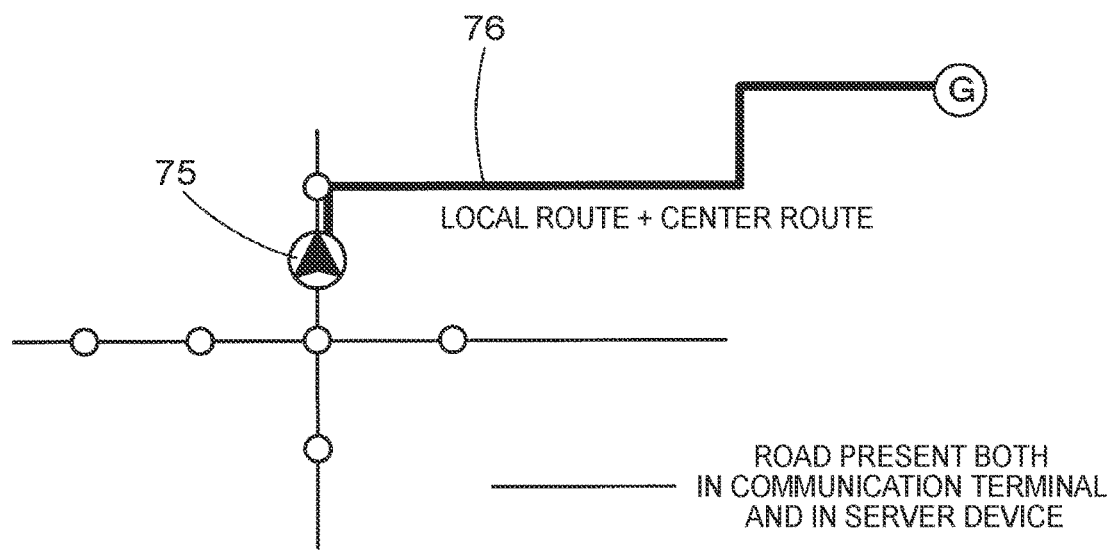
FIG. 9 is a diagram illustrating an example of route retrieval when a vehicle is located on a road included both in map information provided in the communication terminal and in map information provided in the server device.

As a result, as illustrated in FIG. 9, when a vehicle 75 is located on a road included both in the terminal-side map information 48 provided in the communication terminal 5 and in the device-side map information 25 provided in the server device 3 and when a route from a current position of the vehicle 75 to a destination is retrieved, a route obtained by connecting a local route that is a route retrieved by the communication terminal 5 to a center route that is a route retrieved by the server device 3 is identified as a server-recommended route 76. As a result, guidance can be provided based on the local route in the communication terminal 5 even after the route retrieval request is given from the communication terminal 5 and before the route retrieved by the server device 3 is acquired. Thus, it is possible to minimize the occurrence of an event that travel guidance is not provided based on the guidance route.

Figure 10:
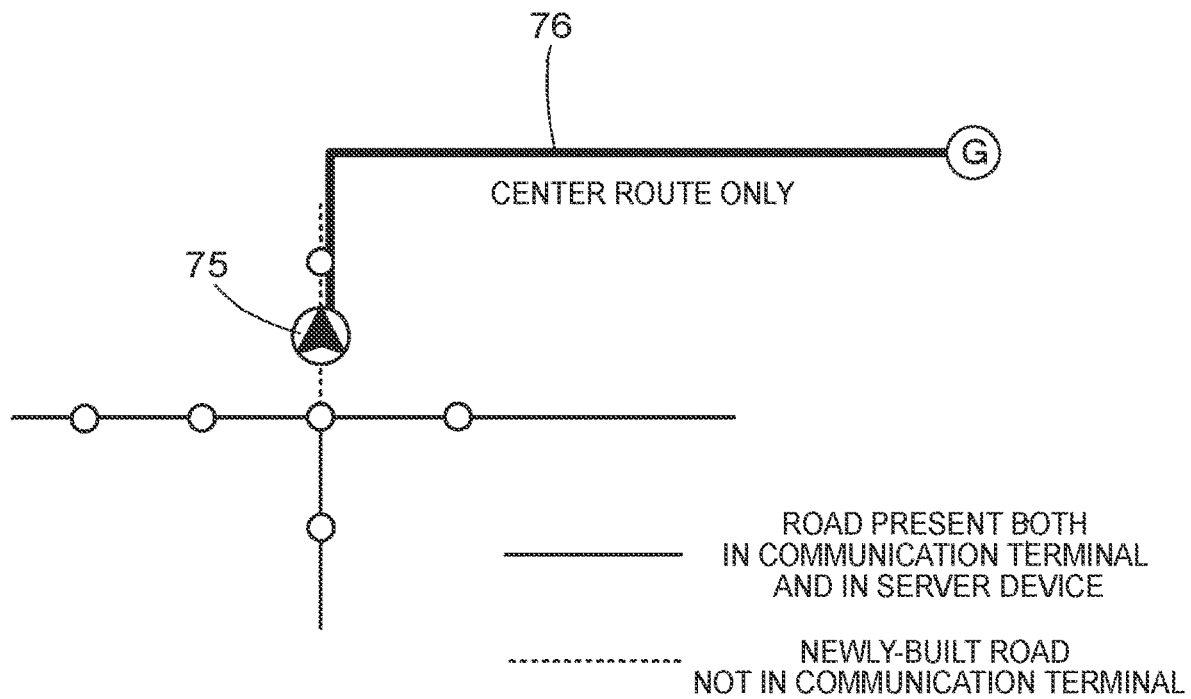
FIG. 10 is a diagram illustrating an example of route retrieval when the vehicle is located on a newly-built road that is not included in the map information provided in the communication terminal.

As illustrated in FIG. 10, when the vehicle 75 is located on a newly-built road that is not present in the terminal-side map information 48 provided in the communication terminal 5 and when a route from a current position of the vehicle 75 to a destination is retrieved, a center route that is a route retrieved by the server device 3 based on the map information of the latest version is identified as the server-recommended route 76 without using a local route that is a route retrieved by the communication terminal 5. As a result, it is possible to appropriately set a guidance route from the current position of the vehicle and to minimize the occurrence of the event that travel guidance is not provided based on the guidance route. In order to identify a current position of the vehicle, provide travel guidance, and display an image in the communication terminal 5, not only the terminal-side map information 48 and the travel guidance information 26 that are stored in the terminal-side map DB 45 but also the travel guidance information 26 created based on the map information of the latest version can be used while being acquired from the server device 3 as described above. Thus, guidance can appropriately be provided even if the vehicle is located on a newly-built road that is not present in the terminal-side map information 48 provided in the communication terminal 5.

As described above in detail, in the route retrieval system 1, the server device 3, the communication terminal 5, and the computer program to be executed by the server device 3 and the communication terminal 5 according to this embodiment, when the route retrieval start condition is satisfied, the communication terminal 5 receives, from the server device 3, the travel guidance information 26 for identifying the position of the vehicle on a map, identifies a current position of the vehicle based on the received travel guidance information 26, and transmits, to the server device 3, a route retrieval request in which the identified current position of the vehicle is set as a departure point (S7). When the route retrieval request is received from the communication terminal 5, the server device 3 retrieves a route from the departure point to a destination by using the device-side map information 25 provided in the server device 3 (S25, S26, S27), and transmits the retrieved route to the communication terminal 5 (S13). Therefore, when the center route retrieval is executed, it is possible to minimize the occurrence of the event that travel guidance is not provided based on the guidance route after the route retrieval request is given from the communication terminal 5. Even if the version of the map information provided in the communication terminal 5 is earlier than that of the map information provided in the server device 3 and if the vehicle travels along a new road that is not included in the map information provided in the communication terminal 5, an appropriate center route from the current position of the vehicle can be acquired from the server device 3 by using the travel guidance information 26 transmitted from the server device 3.

In this embodiment, a current position of the vehicle is identified by acquiring, from the server device 3 in advance, the travel guidance information 26 that is location road information for identifying the position of the vehicle on a map instead of map information (including facility data and data to be used for route retrieval in addition to the location road information) (S2). The data amount of the travel guidance information 26 is smaller than that of the map information, and therefore the information delivery amount can be reduced as compared to a case where map information of a new version is acquired in advance in order to identify a current position of the vehicle (or a case where update information to be used for updating the map information to a new version is acquired).

It is understood that the embodiment described above need not be limiting, and various revisions and modifications may be made without departing from the spirit of the broad inventive principles.

For example, in this embodiment, the server device 3 executes the processing related to identification of the reference road array in S22 to S24, but the communication terminal 5 may execute the processing. In this case, it is necessary that information for identifying a link that is present in the terminal-side map information 48 but is not present in the device-side map information 25 be provided in the communication terminal 5 or acquired from the server device 3.

In this embodiment, the travel guidance information 26 includes the matching data necessary for map matching of a current position of the user, the guidance data necessary for guidance that prompts the user to move along a guidance route, such as guidance on a right or left turn at a guidance intersection, and the display data to be used for displaying a map image and a guidance screen. The travel guidance information 26 may be implemented as long as the travel guidance information 26 at least includes the matching data necessary for map matching of a current position of the user.

In this embodiment, the server-recommended route is obtained by retrieving the continued recommended route that is the recommended route from the end point of the reference road array to the destination (S25) and connecting the reference road array to the continued recommended route. A recommended route to the destination from a point other than the end point of the reference road array (for example, a node closer to the departure point than the end point) may be retrieved as the continued recommended route.

In this embodiment, the reference road array is identified in units of link, but may be identified in units other than the units of link as long as the road is sectioned in the units in the map information.

In this embodiment, the communication terminal 5 temporarily sets the terminal-recommended route as the guidance route until the communication terminal 5 receives the server-recommended route from the server device 3 (S5). The temporary setting of the terminal-recommended route as the guidance route need not be executed.

Although the embodiment that implements the communication terminal, the server device, the route retrieval system, and the computer program is described above, the communication terminal may have the following configurations. In those cases, the following effects are attained.

For example, a first configuration is as follows.

The communication terminal (5) is connected to the server device (3) in a bidirectionally communicable manner, and is configured to transmit a departure point, a destination, and a route retrieval request from the departure point to the destination to the server device and to acquire a route that is retrieved and delivered by the server device in response to the route retrieval request. The communication terminal includes the position identifying means (33) for receiving, from the server device, the location road information (26) for identifying the position of the moving object (75) on a map and identifying the position of the moving object based on the received location road information, the retrieval request transmitting means (33) for transmitting, to the server device, the route retrieval request in which the position of the moving object that is identified by the position identifying means is set as the departure point, and the route receiving means (33) for receiving, from the server device, a route that is retrieved by the server device in response to the route retrieval request.

According to the communication terminal having the configuration described above, when the center route retrieval is executed, it is possible to minimize the occurrence of an event that travel guidance is not provided based on a guidance route after the route retrieval request is given from the communication terminal. Even if the moving object travels along a new road that is not included in the map information provided in the communication terminal, an appropriate route from the current position of the moving object can be acquired from the server device by using the location road information transmitted from the server device.

A second configuration is as follows.

When the moving object (75) deviates from the guidance route set by the communication terminal (5), the position identifying means (33) identifies the position of the moving object after the deviation based on the location road information (26).

According to the communication terminal having the configuration described above, particularly when the moving object deviates from the guidance route and when the road where the moving object is located after the deviation is a road that is not included in the map information provided in the communication terminal, an appropriate route from the current position of the moving object can be acquired from the server device.

A third configuration is as follows.

The location road information includes information to be used for providing travel guidance for the moving object, and the communication terminal (5) includes travel guidance means (33) for providing travel guidance for the moving object (75) by using the location road information (26) within a time range from the transmission of the route retrieval request to the server device (3) to the reception of the route.

According to the communication terminal having the configuration described above, appropriate travel guidance can continuously be provided by using the location road information until the route is acquired from the server device.

A fourth configuration is as follows.

The position identifying means (33) identifies a currently-located road that is a road where the moving object is located based on the location road information (26). The communication terminal includes road determining means (33) for determining whether the currently-located road is a road included in the terminal-side route retrieval road information (48) provided in the communication terminal when the route retrieval request is given to the server device. When it is determined that the currently-located road is the road included in the terminal-side route retrieval road information, the retrieval request transmitting means (33) retrieves a route to the destination while setting the position of the moving object as the departure point by using the terminal-side route retrieval road information, and transmits route information for identifying a terminal-recommended route that is the retrieved route to the server device together with the route retrieval request. When it is determined that the currently-located road is not the road included in the terminal-side route retrieval road information, the retrieval request transmitting means transmits the route retrieval request to the server device.

According to the communication terminal having the configuration described above, when the center route retrieval is executed, it is possible to minimize the occurrence of the event that travel guidance is not provided based on the guidance route after the route retrieval request is given from the communication terminal. Even if the version of the map information provided in the communication terminal is earlier than that of the map information provided in the server device, the guidance route from the current position of the moving object can be set appropriately.

A fifth configuration is as follows.

When the moving object (75) deviates from the guidance route set by the communication terminal (5), the road determining means (33) determines whether the currently-located road where the moving object is located after the deviation is the road included in the terminal-side route retrieval road information (48).

According to the communication terminal having the configuration described above, particularly when the moving object deviates from the guidance route and when the road where the moving object is located after the deviation is the road that is not included in the map information provided in the communication terminal, the guidance route from the current position of the moving object can be set appropriately. As a result, it is possible to prevent the occurrence of the event that travel guidance is not provided based on the guidance route over a long time after the deviation.

A sixth configuration is as follows.

When it is determined that the currently-located road is the road included in the terminal-side route retrieval road information (48), the retrieval request transmitting means (33) transmits the route information for identifying a route within a predetermined distance from the departure point in the terminal-recommended route (71).

According to the communication terminal having the configuration described above, the communication amount between the communication terminal and the server device can be minimized. As a result, the route retrieved by the server device can be provided to the communication terminal more promptly.

A seventh configuration is as follows.

When the route information is transmitted to the server device (3) together with the route retrieval request, the route receiving means (33) receives, from the server device, a route from the departure point to the destination that is retrieved by using the device-side route retrieval road information (25) provided in the server device and includes at least a part of the terminal-recommended route (71) identified by the route information. When the route retrieval request is transmitted without transmitting the route information to the server device, the route receiving means (33) receives, from the server device, a route from the departure point to the destination that is retrieved by using the device-side route retrieval road information.

According to the communication terminal having the configuration described above, when the moving object is located on the road included in the map information provided in the communication terminal, a route including a local route that is a route retrieved by the communication terminal is set as the guidance route. Therefore, travel guidance can be provided based on the local route even after the route retrieval request is given from the communication terminal and before the route retrieved by the server device is acquired. Thus, it is possible to minimize the occurrence of the event that travel guidance is not provided based on the guidance route. When the moving object is located on a newly-built road that is not included in the map information provided in the communication terminal, a center route that is a route retrieved by the server device is set as the guidance route without using the local route retrieved by the communication terminal. Therefore, the guidance route from the current position of the moving object can be set appropriately.

The invention claimed is:

1. A communication terminal connected to a server device in a bidirectionally communicable manner and configured to transmit a departure point, a destination, and a route retrieval request from the departure point to the destination to the server device and to acquire a route that is retrieved and delivered by the server device in response to the route retrieval request, the communication terminal comprising:

a processor programmed to:

receive, from the server device, location road information for identifying a position of a moving object on a map and identifying the position of the moving object based on the received location road information, the location road information including information to be used for providing travel guidance for the moving object;

identify a currently-located road that is a road where the moving object is located based on the location road information;

determine whether the currently-located road is a road included in terminal-side route retrieval road information provided in the communication terminal when the route retrieval request is given to the server device;

retrieve, when it is determined that the currently-located road is the road included in the terminal-side route retrieval road information, a route to the destination while setting the position of the moving object as the departure point by using the terminal-side route retrieval road information;

transmit route information for identifying a terminal-recommended route that is the retrieved route to the server device together with the route retrieval request, the route information for identifying the terminal-recommended route including information for identifying a continuous link array from the departure point towards the destination, the continuous link array being within a predetermined distance from the departure point;

transmit, to the server device, when it is determined that the currently-located road is not the road included in the terminal-side route retrieval road information, the route retrieval request in which the identified position of the moving object is set as the departure point;

receive, from the server device, a route that is retrieved by the server device in response to the route retrieval request; and provide travel guidance for the moving object by using the location road information within a time range from the transmission of the route retrieval request to the server device to the reception of the route.

2. The communication terminal according to claim 1, wherein the processor is programmed to identify, when the moving object deviates from a guidance route set by the communication terminal, a position of the moving object after the deviation based on the location road information.

3. The communication terminal according to claim 1, wherein the processor is programmed to determine, when the moving object deviates from a guidance route set by the communication terminal, whether the currently-located road where the moving object is located after the deviation is the road included in the terminal-side route retrieval road information.

4. The communication terminal according to claim 1, wherein, the processor is programmed to transmit, when it is determined that the currently-located road is the road included in the terminal-side route retrieval road information, the route information for identifying a route within a predetermined distance from the departure point in the terminal-recommended route.

5. The communication terminal according to claim 1, wherein the processor is programmed to:

receive from the server device, when the route information is transmitted to the server device together with the route retrieval request, a route from the departure point to the destination that is retrieved by using device-side route retrieval road information provided in the server device and includes at least a part of the terminal-recommended route identified by the route information; and receive from the server device, when the route retrieval request is transmitted without transmitting the route information to the server device, a route from the departure point to the destination that is retrieved by using the device-side route retrieval road information.

6. A computer-readable storage medium storing a computer-executable program for causing a communication terminal, which is connected to a server device in a bidirectionally communicable manner and is configured to transmit a departure point, a destination, and a route retrieval request from the departure point to the destination to the server device and to acquire a route that is retrieved and delivered by the server device in response to the route retrieval request, to perform functions comprising:

receiving, from the server device, location road information for identifying a position of a moving object on a map and identifying the position of the moving object based on the received location road information, the location road information including information to be used for providing travel guidance for the moving object;

identifying a currently-located road that is a road where the moving object is located based on the location road information;

determining whether the currently-located road is a road included in terminal-side route retrieval road information provided in the communication terminal when the route retrieval request is given to the server device;

retrieving, when it is determined that the currently-located road is the road included in the terminal-side route retrieval road information, a route to the destination while setting the position of the moving object as the departure point by using the terminal-side route retrieval road information;

transmitting route information for identifying a terminal-recommended route that is the retrieved route to the server device together with the route retrieval request, the route information for identifying the terminal-recommended route including information for identifying a continuous link array from the departure point towards the destination, the continuous link array being within a predetermined distance from the departure point;

transmitting, to the server device, when it is determined that the currently-located road is not the road included in the terminal-side route retrieval road information, the route retrieval request in which the identified position of the moving object is set as the departure point;

receiving, from the server device, a route that is retrieved by the server device in response to the route retrieval request; and providing travel guidance for the moving object by using the location road information within a time range from the transmission of the route retrieval request to the server device to the reception of the route.

7. A server device connected to a communication terminal in a bidirectionally communicable manner and configured to receive a departure point, a destination, and a route retrieval request from the departure point to the destination from the communication terminal and to deliver a route retrieved in response to the received route retrieval request to the communication terminal, the server device comprising:

a processor programmed to:

transmit, to the communication terminal, location road information for identifying a position of a moving object on a map, the location road information including information to be used for providing travel guidance for the moving object;

receive, when the route retrieval request is received from the communication terminal, the route retrieval request in which the position of the moving object that is identified by the communication terminal based on the location road information is set as the departure point;

receive from the communication terminal, route information for identifying a terminal-recommended route together with the route retrieval request, the terminal-recommended route being a route retrieved by the communication terminal using terminal-side route retrieval road information, the route information for identifying the terminal-recommended route including information for identifying a continuous link array from the departure point towards the destination, the continuous link array being within a predetermined distance from the departure point;

retrieve a route from the departure point to the destination by using device-side route retrieval road information provided in the server device; and deliver the retrieved route to the communication terminal.

8. A route retrieval system, comprising:

a communication terminal connected to a server device in a bidirectionally communicable manner and configured to transmit a departure point, a destination, and a route retrieval request from the departure point to the destination to the server device and to acquire a route that is retrieved and delivered by the server device in response to the route retrieval request, the communication terminal comprising a first processor programmed to:

receive, from the server device, location road information for identifying a position of a moving object on a map and identifying the position of the moving object based on the received location road information, the location road information including information to be used for providing travel guidance for the moving object;

identify a currently-located road that is a road where the moving object is located based on the location road information;

determine whether the currently-located road is a road included in terminal-side route retrieval road information provided in the communication terminal when the route retrieval request is given to the server device;

retrieve, when it is determined that the currently-located road is the road included in the terminal-side route retrieval road information, a route to the destination while setting the position of the moving object as the departure point by using the terminal-side route retrieval road information;

transmit route information for identifying a terminal-recommended route that is the retrieved route to the server device together with the route retrieval request, the route information for identifying the terminal-recommended route including information for identifying a continuous link array from the departure point towards the destination, the continuous link array being within a predetermined distance from the departure point;

transmit, to the server device, when it is determined that the currently-located road is not the road included in the terminal-side route retrieval road information, the route retrieval request in which the identified position of the moving object is set as the departure point;

receive, from the server device, a route that is retrieved by the server device in response to the route retrieval request; and provide travel guidance for the moving object by using the location road information within a time range from the transmission of the route retrieval request to the server device to the reception of the route; and the server device comprising a second processor programmed to:

transmit, to the communication terminal, the location road information for identifying the position of the moving object on the map;

receive from the communication terminal, route information for identifying a terminal-recommended route together with the route retrieval request;

retrieve, when the route retrieval request is received, a route from the departure point to the destination by using device-side route retrieval road information provided in the server device; and deliver the retrieved route to the communication terminal.

* * * * *